United States Patent [19]

Schwartz et al.

[11] Patent Number: 5,829,876
[45] Date of Patent: Nov. 3, 1998

[54] CALIBRATION OF PROCESS CONTROL TEMPERATURE TRANSMITTER

[75] Inventors: Bradley N. Schwartz, Lakeville; William R. Kirkpatrick, Faribault, both of Minn.

[73] Assignee: Rosemount Inc., Eden Prairie, Minn.

[21] Appl. No.: 857,236

[22] Filed: May 16, 1997

Related U.S. Application Data

[62] Division of Ser. No. 313,452, Sep. 27, 1994, Pat. No. 5,669,713.

[51] Int. Cl.$^6$ ................................................ G01K 15/00
[52] U.S. Cl. ............................................................ 374/1
[58] Field of Search ................................ 374/1, 179, 180, 374/181, 182, 183; 364/557, 571.01, 574

[56] References Cited

U.S. PATENT DOCUMENTS

| | | | |
|---|---|---|---|
| 1,344,462 | 6/1920 | Thwing . | |
| 3,138,776 | 6/1964 | Jones, Jr. | 338/28 |
| 3,327,517 | 6/1967 | Huffman | 73/1 |
| 3,504,522 | 4/1970 | Jasik et al. | 73/1 |
| 3,911,745 | 10/1975 | Erhardt | 73/341 |
| 4,122,719 | 10/1978 | Carlson et al. | 73/342 |
| 4,130,019 | 12/1978 | Nitschke | 73/341 |
| 4,147,061 | 4/1979 | Wester et al. | 73/341 |
| 4,369,352 | 1/1983 | Bowles | 219/413 |
| 4,475,823 | 10/1984 | Stone | 374/1 |
| 4,481,596 | 11/1984 | Townzen | 364/571 |
| 4,528,637 | 7/1985 | Smith | 364/557 |

(List continued on next page.)

FOREIGN PATENT DOCUMENTS

| | | |
|---|---|---|
| 0 404 567 A1 | 12/1990 | European Pat. Off. . |
| 0 546 855 A1 | 6/1993 | European Pat. Off. . |
| 2 256 051 | 11/1992 | United Kingdom . |

OTHER PUBLICATIONS

"The Dynamic Thermometer: An Instrument for Fast Measurements with Platinum Resistance Thermometers," *Trans Inst. MC*, by H. Rosemary Taylor and M. Bashir Rihawi, vol. 15, No. 1, 1993, pp. 11–18.

"Shrinking the Hardware of Thermocouple Calibration," *Control and Instrumentation*, vol. 15, (1983), No. 6, pp. 59, 61 and 63.

"Isolation and Conditioning Clean up Industrial Signal," *Electronic Design*, vol. 30, Apr. 1982, pp. 169–174 and 176 and 178.

Rosemount Product Data Sheet PDS 4275, "HART Communicator", Rosemount Inc., Chanhassen, MN, Jan. 1994, pp. 1–5.

Rosemount Product Data Sheet PDS 4384, "Model 262, 4–20 mA FIELD CALIBRATOR", Rosemount Inc., Chanhassen, MN Sep. 1992, pp. 1–3.

Rosemount Product Data Sheet PDS 2560, "Model 268, SMART FAMILY –Interface Featuring HART Communicatons", Rosemount Inc., Chanhassen, MN, Mar. 1992, pp. 1–3.

*Primary Examiner*—Ronald L. Biegel
*Assistant Examiner*—Paul D. Amrozowicz
*Attorney, Agent, or Firm*—Westman, Champlin & Kelly, P.A.

[57] ABSTRACT

A transmitter in a process control loop measures temperature. A calibrator includes a known calibration element which is connected to the transmitter. Software in the transmitter compares a measured value of the calibration element with the actual value of the calibration element and responsively calibrates the transmitter. The calibrator includes a temperature calibration sensor for coupling to a terminal block of the transmitter. The temperature calibration sensor provides an actual temperature input to the transmitter. The transmitter measures actual temperature of the terminal block and compares actual temperature with a temperature measured by an internal terminal block temperature sensor, and responsively calibrates the internal temperature sensor.

12 Claims, 6 Drawing Sheets

U.S. PATENT DOCUMENTS

| | | | |
|---|---|---|---|
| 4,532,601 | 7/1985 | Lenderking et al. | 364/571 |
| 4,623,266 | 11/1986 | Kielb | 374/181 |
| 4,716,411 | 12/1987 | Nakamura | 340/870.17 |
| 4,870,863 | 10/1989 | Duncan et al. | 73/431 |
| 4,936,690 | 6/1990 | Goetzinger | 374/181 |
| 5,046,858 | 9/1991 | Tucker | 374/179 |
| 5,056,048 | 10/1991 | Seperant | 364/557 |
| 5,066,140 | 11/1991 | Beran | 374/134 |
| 5,083,288 | 1/1992 | Somlydody et al. | 364/550 |
| 5,121,994 | 6/1992 | Molitoris | 374/179 |
| 5,161,892 | 11/1992 | Shigezawa et al. | 374/179 |
| 5,211,480 | 5/1993 | Thomas et al. | 374/161 |
| 5,251,148 | 10/1993 | Haines et al. | 364/509 |
| 5,317,520 | 5/1994 | Castle | 364/482 |
| 5,437,745 | 8/1995 | Frank et al. | 148/435 |
| 5,492,482 | 2/1996 | Lockman et al. | 439/329 |

CALIBRATION OF PROCESS CONTROL TEMPERATURE TRANSMITTER

This is a Divisional of application Ser. No. 08/313,452, filed Sep. 27, 1994, now U.S. Pat. No. 5,669,713. Priority of the prior application is claimed pursuant to 35 USC § 120.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to transmitters used in process control loops. More specifically, the present invention relates to calibrating temperature transmitters used in process control loops.

Process control transmitters are used to measure process parameters in a process control system. Microprocessor based transmitters include a sensor or sensor input, an analog-to-digital converter for converting an output from the sensor into a digital format, a microprocessor for compensating the digitized output, and an output circuit for transmitting the compensated output. Typically, this transmission is over a process control loop, such as a 4–20 mA current loop. One example parameter is temperature, which is sensed by measuring the resistance of an RTD (Resistive Temperature Device, also called a PRT, Platinum Resistance Thermometer) sensor, or the voltage output of a thermocouple sensor.

One technique for sensing the parameter is by comparison of the resistance of an RTD with an internal reference resistance level in the transmitter which is calibrated when the transmitter is manufactured. For example, resistance of the RTD is measured by connecting it in series with a known reference resistance ($R_{REF}$) and applying a current common to both resistances. The resistance of the sensor ($R_{INPUT}$) is expressed as follows:

$$R_{INPUT} = \frac{V_{RINPUT}}{V_{RREF}} \times (R_{REFNOM} + R_{CAL1} + R_{CAL2}) \quad \text{Equation 1}$$

where:

$R_{REFNOM}$=the nominal resistance of the reference resistance in ohms;

$R_{CAL1}$=a calibration offset in ohms determined during manufacture. This value represents the difference between the calibrated reference resistance ($R_{REF}$) and the nominal value of the reference resistance;

$R_{CAL2}$=a user calibration offset;

$V_{RINPUT}$=voltage drop across the input; and $V_{RREF}$=voltage drop across $R_{REF}$.

Equation 1 is used as part of an auto-zeroing and auto-spanning routine in that errors in measurement of $V_{RINPUT}$ in the numerator tend to be the same as errors in $V_{RREF}$ in the denominator and therefore cancel.

The A/D converter digitizes the voltages of Equation 1. The microprocessor receives the digitized values and calculates and compensates $R_{INPUT}$ according to Equation 1 which is converted into a corresponding sensor temperature value with a look-up table or suitable equation by the microprocessor. The output circuit in the transmitter receives the sensor temperature value and provides an output to the loop as a current level or as a digital value.

Unfortunately, $R_{REF}$ sometimes drifts from the calibrated value of $R_{REFNOM}$ and $R_{CAL1}$, leading to inaccuracies in measurement of temperature.

A typical prior art method of calibrating the $R_{REF}$ is to connect an external predetermined resistance to the sensor input of the transmitter and have the transmitter enter a calibration mode. The transmitter compares the expected value of the predetermined resistance with the measured value of the $R_{INPUT}$ and uses the difference to calibrate its electronics by adjusting $R_{CAL2}$, the user trim. Typically, the predetermined resistance is an active circuit or a resistance decade box. Active circuitry which simulates resistance is usually inaccurate and typically incompatible with an intrinsically safe environment. Decade boxes are unrepeatable and inaccurate relative to precision transmitters and are unwieldy, requiring the transmitter to be disconnected from the process loop in the field and brought into a calibration lab. They also suffer from drift in resistance value from changes in ambient temperature.

Thermocouples are also used by transmitters to measure temperature. U.S. Pat. No. 4,936,690, entitled "Thermocouple Transmitter with Cold Junction Compensation," and assigned to the same assignee as the present application, describes such a measurement. A thermocouple junction generates a voltage across the junction related to its temperature. However, a junction between dissimilar metals at the terminal block of the transmitter introduces another thermocouple voltage. To measure the thermocouple temperature, it is necessary to measure the temperature of this "cold junction" at the terminal block connection and compensate for this voltage. Typically, in microprocessor based transmitters, a temperature sensor is thermally coupled to the terminal block and connected to the microprocessor of the transmitter through the A/D converter. The microprocessor compensates the thermocouple voltage based upon the cold junction temperature measured by the PRT. Errors in thermocouple temperature measurements arise if the transmitter inaccurately measures the temperature at the cold junction.

Prior art attempts at calibrating thermocouple multiple input transmitters focus on calibrating the transmitter with a known voltage source. However, the source has typically been relatively unstable with respect to a precision transmitter. For example, a precision thermocouple transmitter has a typical accuracy of 0.04 percent of the actual value. Further, little attention has been given to calibrating the cold junction temperature measurement.

The art lacks a self-contained calibration device for adequately calibrating temperature measurements. Further, the art lacks a device that is stable enough to be effectively traceable to a NIST (National Institute of Standards Technology) traceable reference within the precision of a high precision transmitter. As with RTD'S, voltage calibrations are inaccurate and not stable enough to be useful as NIST traceable devices (e.g., they are not stable enough to hold their calibration for very long).

SUMMARY OF THE INVENTION

The present invention is a temperature transmitter which transmits a measured temperature over a process control loop. To calibrate the transmitter, a known NIST traceable resistance $R_{NIST}$ is coupled to the input of the transmitter, which the transmitter measures as $R_{INPUT}$. The NIST calibrated value of $R_{NIST}$ ($R_{NISTCAL}$) is provided to the microprocessor of the transmitter which then responsively calculates a calibration value $R_{CAL3}$ for use in subsequent measurement of $R_{INPUT}$ and temperature. In a different calibration mode, the transmitter is coupled to a known NIST traceable voltage reference $V_{NIST}$ which the transmitter measures. The NIST calibrated value of $V_{NIST}$ ($V_{NISTCAL}$) is provided to the transmitter input circuitry and the transmitter responsively calculates a voltage calibration value $V_{CAL3}$. In a final calibration mode, a temperature probe that may have NIST traceable calibration is coupled to the terminal block of the transmitter, and the transmitter measures the cold junction temperature and then responsively calibrates an internal cold junction temperature sensor.

A calibrator adapted for coupling to the transmitter includes the NIST traceable resistance $R_{NIST}$, the NIST traceable voltage $V_{NIST}$ and the NIST traceable temperature probe ($P_{NIST}$). In one embodiment, the calibrator communicates with the transmitter over the two-wire process control loop.

DETAILED DESCRIPTION OF THE PREFERRED EMBODIMENTS

Figure 1A:
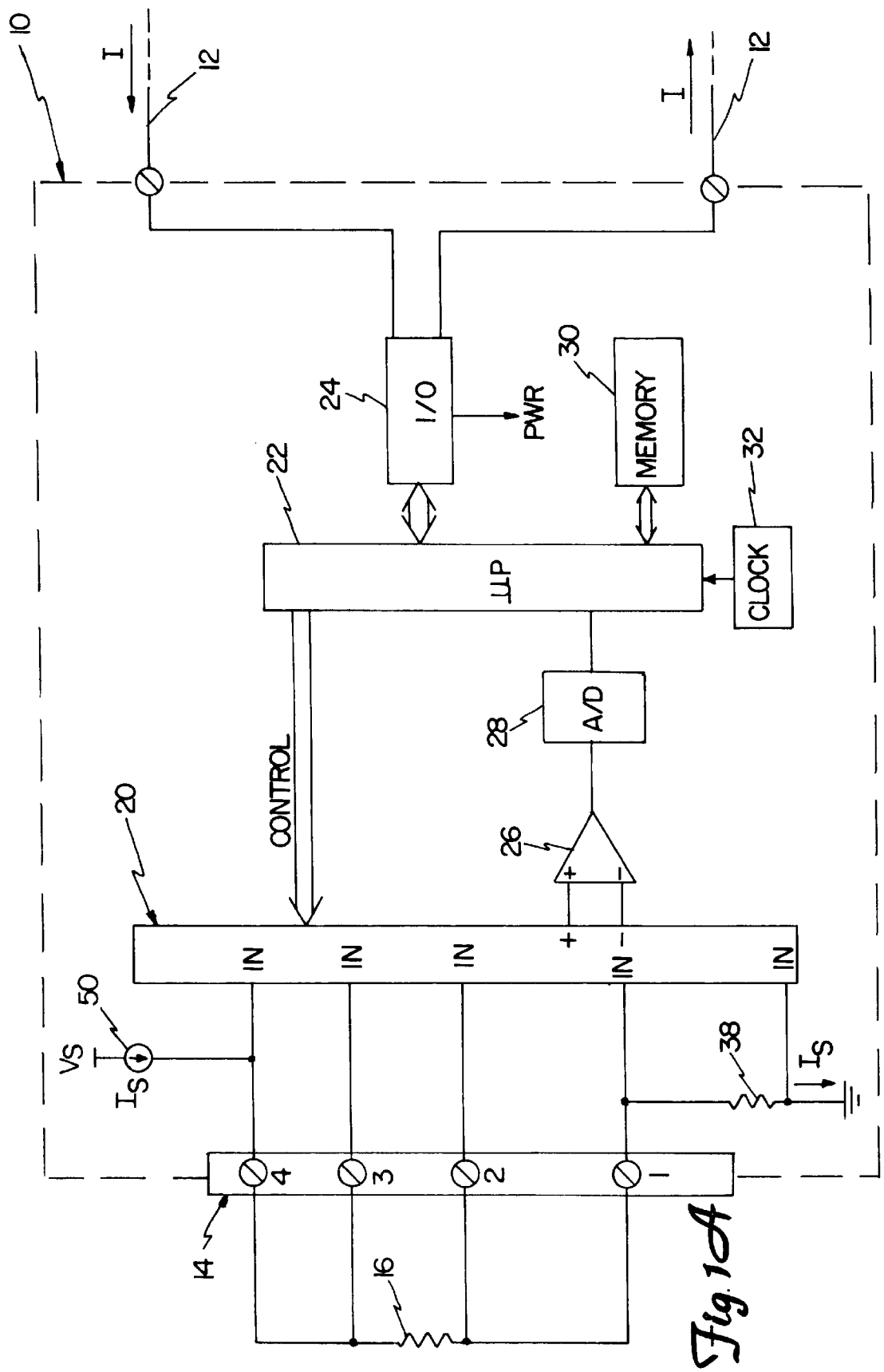
FIG. 1A is a block diagram of a temperature transmitter connected to measure temperature with an RTD sensor.

FIG. 1A is a block diagram of temperature transmitter 10 connected to measure temperature with an RTD sensor. Transmitter 10 couples to process control loop 12 which provides power to transmitter 10 and over which information is transmitted and received. Transmitter 10 includes terminal block 14 having terminals 1 through 4 for coupling to, for example, an RTD temperature sensor 16 or a thermocouple temperature sensor 18 (shown in FIG. 1B). FIG. 1A shows the electrical connections to RTD 16. Sensor 16 (and sensor 18) can be either internal or external to transmitter 10. Transmitter 10 includes multiplexer 20 controlled by microprocessor 22 which is coupled to control loop 12 through input/output (I/O) circuitry 24. Multiplexer 20 multiplexes appropriate sets of analog signals, including signals from terminals 1 through 4, to positive and negative inputs of differential amplifier 26, which connects to high accuracy A/D converter 28. In one embodiment, converter 28 has an accuracy of 17 bits and a conversion rate of 14 samples/second. One example conversion technique is described in "Resolve 22 Bits Easily with Charge-Balance ADC's," by Thomas J. Mego, published Jun. 25, 1987, in *Electronic Design Magazine*, page 109. Memory 30 stores instructions and information for microprocessor 22, which operates at a speed determined by clock 32. Multiplexer 20 selectively connects its inputs to the positive or negative inputs of differential amplifier 26. A resistance 38 couples to multiplexer 20 and is connected in series with RTD 16.

In operation, transmitter 10 measures temperature of sensor 16 and transmits a representation of temperature over control loop 12. Transmitter 10 employs the following equation to compute the temperature of RTD 16:

$$R_{INPUT} = \frac{V_{RINPUT}}{V_{RREF}} (R_{REFNOM} + R_{CAL1} + R_{CAL2} + R_{CAL3}) \quad \text{Equation 2}$$

where:

$R_{REFNOM}$=the nominal resistance of the reference resistance in ohms, and/or stored in memory 30;

$R_{CAL1}$=a calibration offset to $R_{REFNOM}$ in ohms determined during manufacture, and/or stored in memory 30. This value represents the difference between the actual value of the reference resistance ($R_{REF}$) and the nominal value of the reference resistance at manufacture;

$R_{CAL2}$=a user calibration offset to $R_{REFNOM}$ stored in memory 30;

$R_{CAL3}$=a field calibrated offset to $R_{REFNOM}$ in accordance with one aspect of the invention, stored in memory 30;

$V_{RINPUT}$=voltage drop across the input; and $V_{RREF}$=voltage drop across $R_{REF}$.

Current source 50 provides current $I_S$ through sensor 16 (via terminals 1 and 4) and reference resistor 38. Microprocessor 22 measures the voltage drop ($V_{RINPUT}$) across RTD 16 between terminals 2 and 3, and the voltage drop ($V_{RREF}$) across resistor 38 with MUX 20. $R_{REFNOM}$, $R_{RCAL1}$, $R_{RCAL2}$ and $R_{RCAL3}$ are retrieved from memory 30. $R_{CAL3}$ is used to accurately calibrate the measurement to a NIST standard as described below. In a four-wire resistance measurement such as this, the voltage drop across the connections to terminals 2 and 3 is largely eliminated, since substantially all the current flows between terminals 1 and 4, and has little impact on the accuracy of the measurement. $R_{INPUT}$ is converted to temperature units with a look-up table or suitable equation stored in memory 30. The improved accuracy of the invention is partially achieved by using additional calibration data stored in memory and additional computational power of the microprocessor.

Figure 1B:
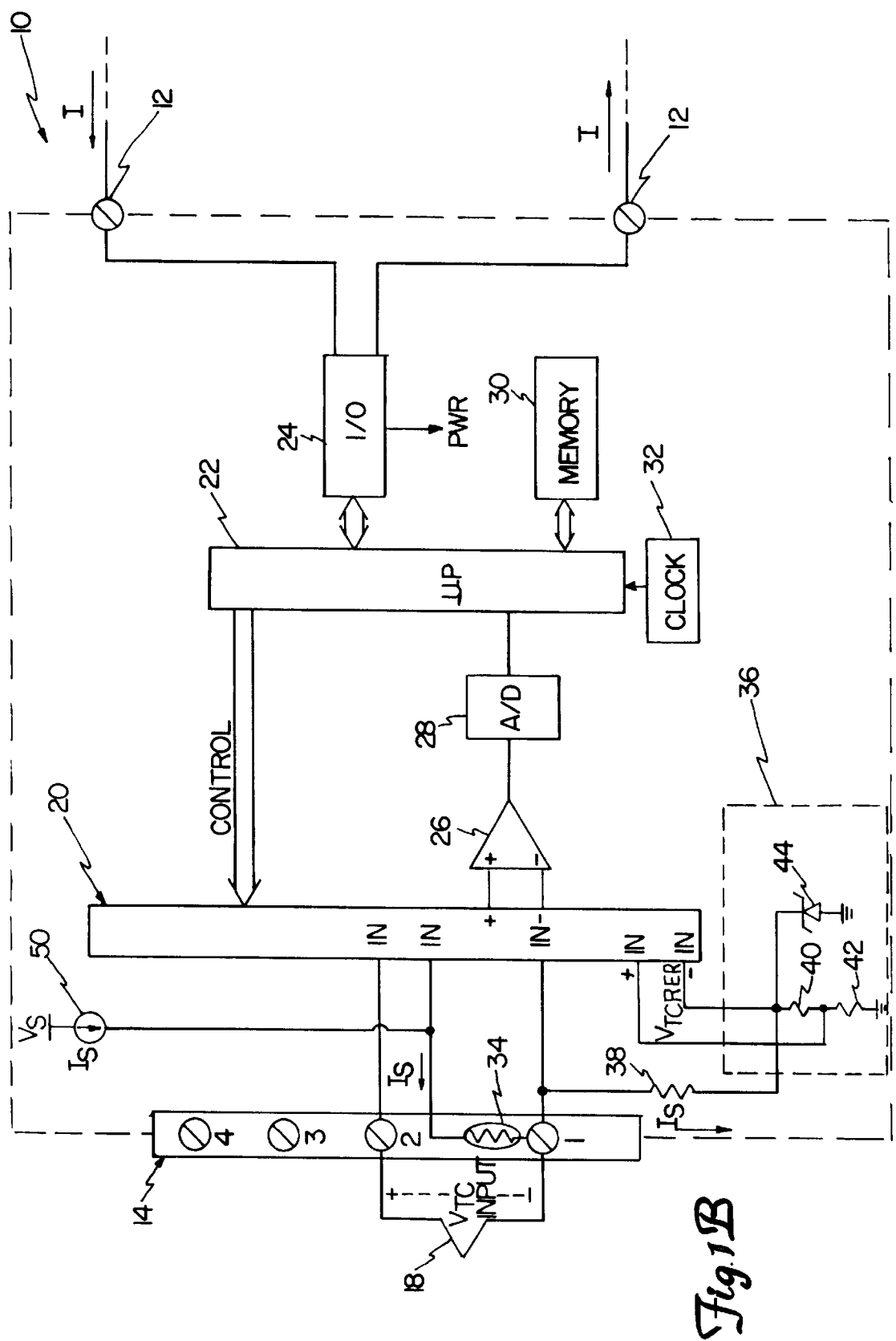
FIG. 1B is a block diagram, like FIG. 1A, of a temperature transmitter connected to measure temperature with a thermocouple sensor.

FIG. 1B shows transmitter 10 connected to measure temperature with thermocouple sensor 18 which creates a voltage $V_{TCINPUT}$ across terminals 1 and 2. Multiplexer 20 couples inputs of differential amplifier 26 to terminals 2 and 1. FIG. 1B shows a voltage reference ($V_{TCREF}$) 36 coupled to MUX 20 and current source 50. A voltage reference 36 includes resistors 40 and 42 connected as a voltage divider and a Zener diode 44.

Transmitter 10 measures the temperature of thermocouple sensor 18 by determining the thermocouple voltage $V_{TC}$ with the following equation:

$$V_{TC} = \frac{V_{TCINPUT}}{V_{TCREF}} (V_{TCREFNOM} + V_{CAL1} + V_{CAL2} + V_{CAL3}) \quad \text{Equation 3}$$

where:

$V_{TCINPUT}$=the measured voltage across terminals 1 and 2 of terminal block 14 sensed by amplifier 26;

$V_{TCREF}$=the measured voltage generated by voltage reference 36 as sensed by amplifier 26;

$V_{TCREFNOM}$=a nominal value of voltage reference 36 stored in memory 30;

$V_{CAL1}$=a factory calibration offset to $V_{TCREFNOM}$ placed in memory 30 during manufacture of transmitter 10;

$V_{CAL2}$=a user trim calibration offset to $V_{TCREFNOM}$ stored in memory 30; and $V_{CAL3}$=a calibration offset to $V_{TCREFNOM}$ stored in memory 30 for calibrating transmitter 10 to a NIST traceable voltage reference.

However, the junction between two dissimilar metals formed at terminal 1 introduces a cold junction error voltage proportional to the temperature of the junction. The error voltage is sensed by measuring the temperature of the junction at terminal 1 based upon the resistance of a PRT (Platinum Resistance Thermometer) sensor 34 and subsequently using a standard equation or look-up table to determine the cold junction error voltage. Resistance of sensor 34 is measured using Equation 2 by applying a current $I_S$ from with current source 50. The resistance of PRT sensor 34 is calculated as:

$$R_{CJCPRT} = R_{PRTEQ.2} + R_{PRTCAL} \qquad \text{Equation 4}$$

where:

$R_{CJCPRT}$=the calibrated resistance of PRT sensor 34;

$R_{PRTEQ.2}$=the resistance of PRT as calculated with Equation 2; and $R_{PRTCAL}$=a calibration offset stored in memory 30.

Microprocessor 20 computes $V_{TC}$ according to Equation 3 and $R_{CJCPRT}$ according to Equation 4, then effectively subtracts $R_{CJCPRT}$ from $V_{TC}$ using an appropriate look-up table or equation. Then the resulting compensated temperature of sensor 18 is coupled to loop 12 via output circuitry 24.

Figure 2:
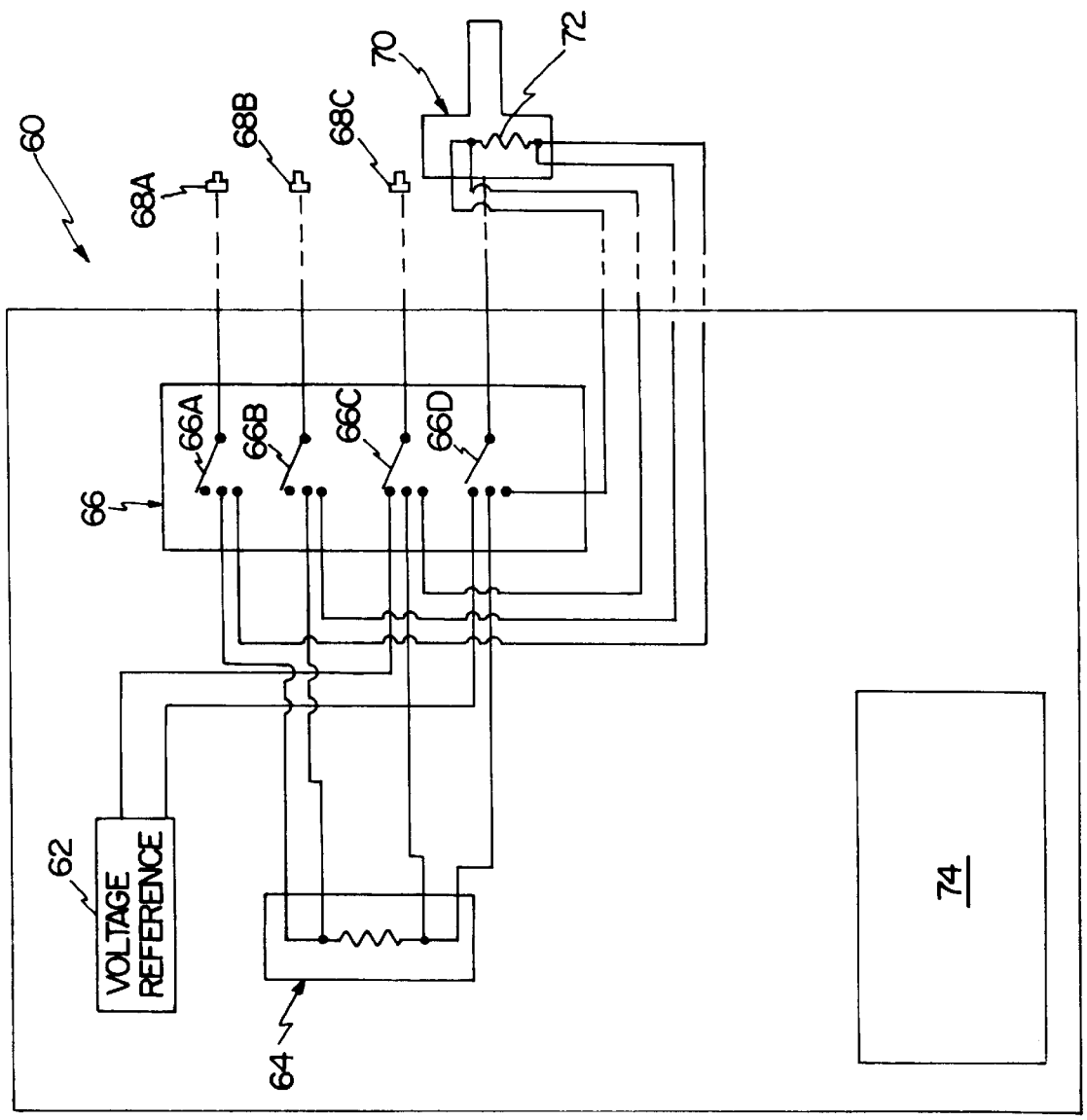
FIG. 2 is a block diagram of one embodiment of a calibrator.

FIG. 2 is a schematic diagram of a calibrator 60 in accordance with the invention. Calibrator 60 includes a voltage reference ($V_{NIST}$) 62, resistor reference ($R_{NIST}$) 64, compound switch 66, connectors 68a, 68b and 68c, and connector/probe 70 which includes a NIST traceable PRT sensor 72. $R_{NIST}$ should be selected as a high accuracy resistance which is stable over time and temperature. Similarly, $V_{NIST}$ should be an accurate voltage reference stable over time and temperature, such as a voltage drop across a temperature and time stable diode. Switch 66 includes ganged switches 66a through 66d which are operated in unison and selectively couple connectors 68a through 68c and connector/probe 70 to reference resistor 64, voltage reference 62 and PRT sensor 72, respectively. Probe 70 is adapted for thermally coupling to terminal block 14 of transmitter 10. In one embodiment, probe 70 screws into terminal block 14.

In operation, $V_{NIST}$ 62 and $R_{NIST}$ 64 and probe 70 are calibrated to a NIST traceable reference using a standard laboratory NIST traceable volt/ohm meter and a temperature standard calibrated 0° C. ice point. The precise calibrated values of reference voltage 62 ($V_{NISTCAL}$), reference resistance 64 ($R_{NISTCAL}$) and $P_{NISTCAL}$ (NIST calibrated value of $R_{PROBE}$ at 0° C.) are marked on labeling 74 on calibrator 60. Calibrator 60 is taken to the location of transmitter 10 and connectors 70, 68c, 68b and 68a are connected to terminals 1, 2, 3 and 4, respectively. Switch 66 is operated to connect one end of resistor $R_{NIST}$ 64 to terminals 1 and 2 and terminal block 14. In this position, $R_{NIST}$ 64 is connected in a manner similar to RTD 16, shown in FIG. 1A. Transmitter 10 receives a command (such as a HART® command) over loop 12 which instructs transmitter 10 to enter a calibration mode and an operator provides transmitter 10 with the NIST calibrated value ($R_{NISTCAL}$) of $R_{NIST}$ 64, as indicated on labeling 74. This information is provided to transmitter 10, for example, over two-wire loop 12 using a hand held communicator such as that described in U.S. Pat. No. 4,988,990, entitled "Dual Master Implied Token Communication System." Microprocessor 22 causes $V_{RINPUT}$ and $V_{REFNOM}$ to be sensed and digitized, and calculates a new value of $R_{CAL3}$, $R_{CAL3(NEW)}$, as follows:

$$R_{CAL3(NEW)} = R_{NISTCAL} \frac{V_{RREF}}{V_{RINPUT}} - R_{REFNOM} - R_{CAL1} - R_{CAL2} \qquad \text{Equation 5}$$

$R_{CAL3(NEW)}$ is stored in memory 30 as $R_{CAL3}$ for subsequent measurements.

Next, the operator positions switch 66 to couple voltage reference $V_{NIST}$ 62 between terminals 1 and 2 of terminal block 14 as $V_{TCINPUT}$. The NIST calibrated value ($V_{NISTCAL}$) of the $V_{NIST}$ 62 is provided to transmitter 10 over 12. A new value of $V_{CAL3}$ ($V_{CAL3(NEW)}$) is determined:

$$V_{CAL3(NEW)} = V_{NISTCAL} \frac{V_{TCREF}}{V_{TCINPUT}} - V_{TCREFNOM} - V_{CAL1} - V_{CAL2} \qquad \text{Equation 6}$$

$V_{CAL3(NEW)}$ is stored in memory 30 for subsequent use as $V_{CAL3}$.

After calibrating resistance and voltage measurements, cold junction temperature sensor 34 is calibrated by placing switch 66 in position to couple the other end of PRT sensor 72 to terminals 1 and 2, and the other end to terminals 3 and 4. Probe/connector 70 is thermally coupled to terminal 1 proximate sensor 34 such that the temperature of PRT sensor 72 is substantially the same as the temperature of PRT internal sensor 34. For example, probe 70 can screw into terminal 1. Transmitter 10 receives the probe NIST value $P_{NISTCAL}$ and initiates PRT calibration by measuring resistance $R_{PROBE}$ of PRT sensor 72 and resistance $R_{CJCPRT}$ PRT sensor 34 and by using Equation 2. In one embodiment, microprocessor 22 compares the difference in these measurements which represents the amount sensor 34 has drifted from its previously calibrated value. This provides a new cold junction calibration value $R_{PRTCAL(NEW)}$ as follows:

$$R_{PRTCAL(NEW)} = R_{PROBE} - R_{CJCPRT} + (P_{NOM} - P_{NIST}) \qquad \text{Equation 7}$$

where $P_{NOM}$ is the nominal resistance of a standard PRT at 0° C. $R_{PRTCAL(NEW)}$ is stored in memory 30 as $R_{PRTCAL}$.

Figure 3:
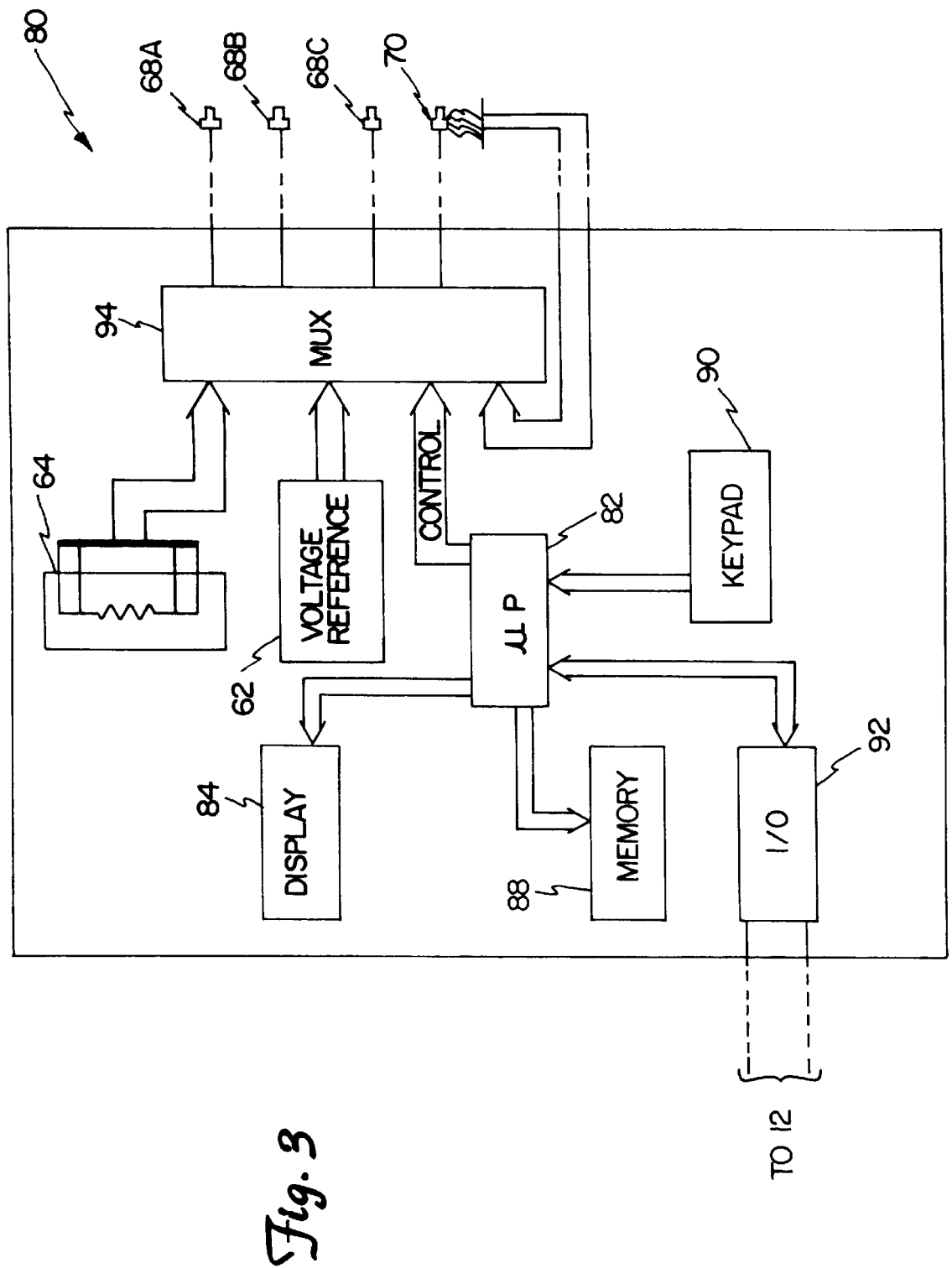
FIG. 3 is a block diagram of another embodiment of a calibrator.

FIG. 3 is a block diagram of a calibrator 80 in accordance with another embodiment. Calibrator 80 includes reference resistance ($R_{NIST}$) 64, voltage reference ($V_{NIST}$) 62, NIST traceable probe $P_{NIST}$ 70, and connectors 68a, 68b, 68c and 70. Microprocessor 82 controls calibrator 80. Microprocessor 82 displays information on display 84, stores information in memory 88, receives information from an operator through keypad 90, and communicates over two-wire loop 12 through input/output circuitry 92. Microprocessor 82 selectively couples $R_{NIST}$ 64, $V_{NIST}$ 62 and PRT sensor 72 (not shown in FIG. 3) to connectors 68a through 68c and 70 using multiplexer 94 which operates similarly to switch 66, shown in FIG. 2.

In operation, an operator measures references 62 and 64 and probe 70 relative to a NIST traceable volt/ohm meter and temperature standard, and enters these values ($R_{NISTCAL}$, $V_{NISTCAL}$ and $P_{NISTCAL}$) into memory 88 using microprocessor 82 and keypad 90. Calibrator 80 is connected to transmitter 10, through connectors 68a through 68c and 70, and couples to loop 12 through input/output circuitry 92 so that calibrator 80 communicates directly with transmitter 10 pursuant to standard communication techniques such as the HART® protocol. An operator instructs calibrator 80 to begin calibration by entering a command on keypad 90. Microprocessor 82 controls multiplexer 94 to connect voltage reference 64 to transmitter 10. Microprocessor 82 instructs microprocessor 22 of transmitter 10 to enter a calibration mode by sending an appropriate command through I/O circuitry 92 over two-wire loop 12. Microprocessor 82 sequentially connects resistance 64 and voltage reference 62 to transmitter 10 through MUX 94 and instructs microprocessor 20 to calibrate resistance and voltage, as disclosed above. Temperature sensor 34 in terminal block 14 is calibrated using sensor 72 (not shown in FIG. 3) which is coupled to transmitter 10 through multiplexer 94 and $R_{PRTCAL(NEW)}$ is determined. In one embodiment, transmitter 10 communicates the amount that its reference values have drifted for display in accordance with ISO 9000 requirements. This can be displayed on a hand held communicator or displayed on calibrator 80.

Figure 4:
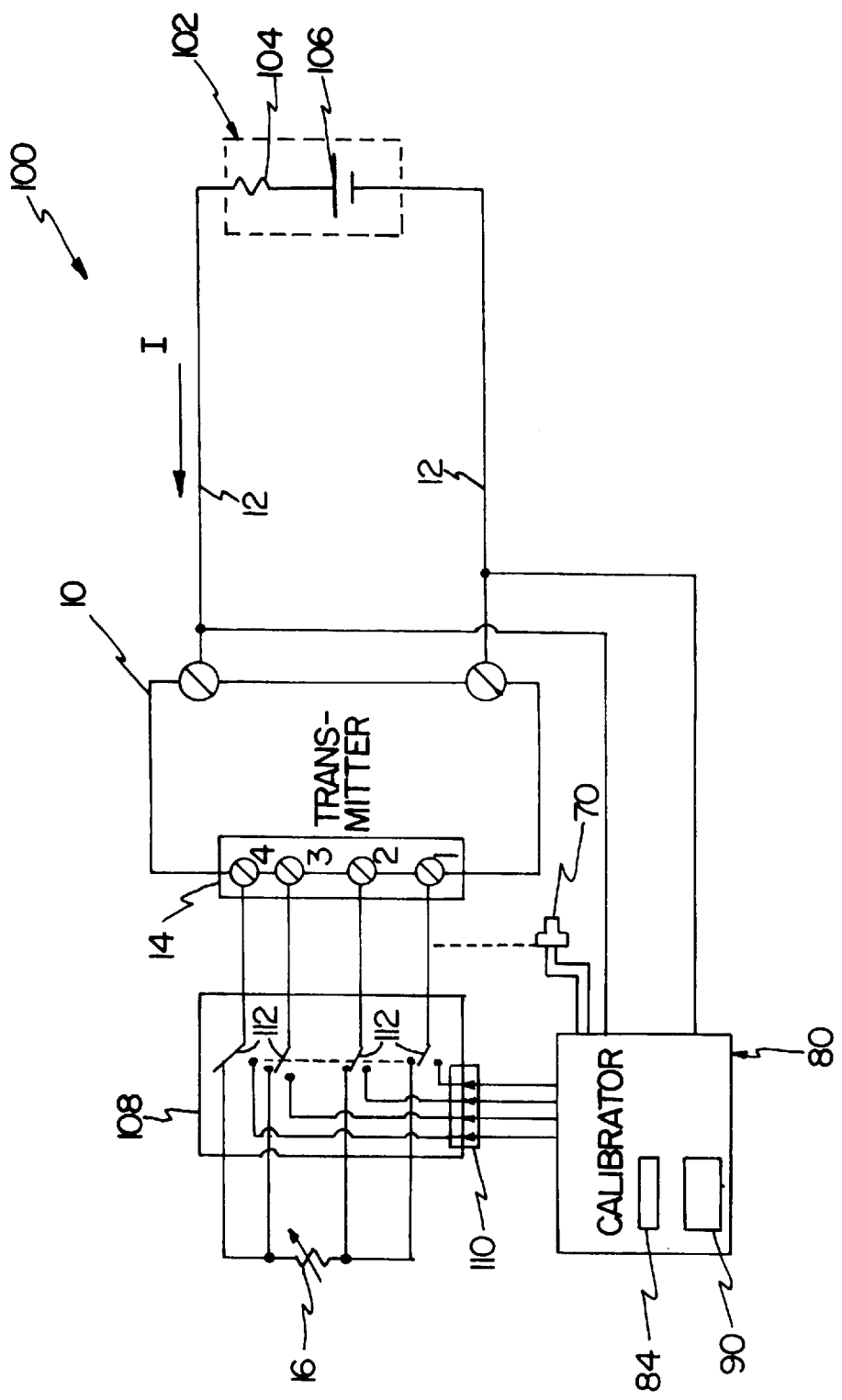
FIG. 4 is a diagram which shows a calibrator coupled to a transmitter.

FIG. 4 is a block diagram of a process control system 100 including transmitter 10, loop 12, and controller electronics 102 which are modeled as resistance 104 and voltage source 106. FIG. 4 shows calibrator 80 coupled to loop 12 and to RTD sensor 16 through junction box 108 which receives a connector 110. Junction box 108 is an alternative to individually screwing connectors 68a, 68b, 68C and 70 into terminal block 14. Junction box 108 allows calibrator 90 to directly couple to terminal block 14 through connector 110. Plugging connector 110 into junction box 108 actuates switches 112, thereby providing electrical connections to terminals 1 through 4 of terminal block 14 and electrically disconnecting sensor 16. To perform a cold junction temperature sensor calibration, sensor 70 is attached to terminal 1 of terminal block 14. Junction box 108 provides a simple and convenient technique of accessing terminals 1 through 4 of terminal block 14. As resistance measurements are made using a four-wire connection, resistance introduced through switches 112 does not reduce the calibration accuracy.

Figure 5:
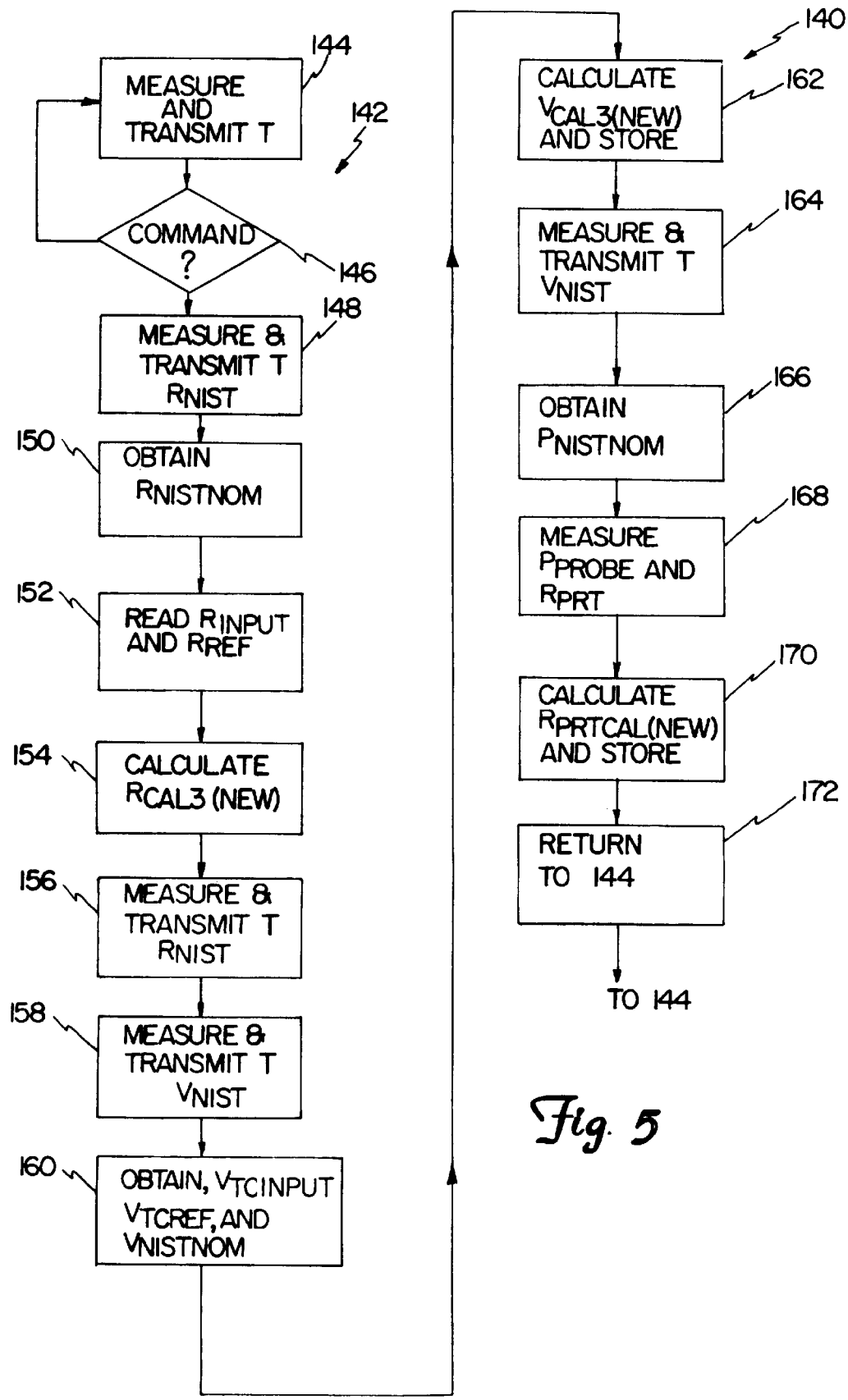
FIG. 5 is a flow chart of operation of a microprocessor in the temperature transmitter.

FIG. 5 is a flow chart 140 showing operation of microprocessor 22 according to instructions in memory 30. Flow chart 140 normally operates in loop 142 which includes measuring and transmitting temperature over two-wire loop 12 at block 144 and checking for a calibration initiation command received over loop 12 at block 146. Upon receipt of a calibration command, microprocessor 22 begins calibration at block 148.

Determination of $R_{CAL3(NEW)}$ is initiated at block 148. Prior to sending a command to begin calibration, an operator has connected the NIST traceable resistance to terminal block 14. At block 148, microprocessor 22 measures and transmits $R_{NIST}$ over process control loop 12. The transmitted value of $R_{NIST}$ can be displayed on a hand held communicator or on calibrator 80. At block 150, microprocessor 22 obtains the value of $R_{NISTCAL}$ over loop 12 from calibrator 80. At block 152, the values of $R_{INPUT}$ and $R_{REF}$ are measured and a new calibration value $R_{CAL3(NEW)}$ is calculated and stored at block 154, according to Equation 5. At block 156, $R_{NIST}$ is again measured and its value is transmitted over loop 12 for receipt by a hand held unit or by calibrator 80. This value should be approximately the same as the value of $R_{NISTCAL}$.

Next, an operator connects the NIST traceable voltage reference to terminal block 14 for calculation of $V_{CAL3(NEW)}$. $V_{NIST}$ is measured and transmitted over two-wire loop at block 158. Microprocessor 22 obtains $V_{NISTCAL}$ from calibrator 80 over loop 12 and $V_{TCINPUT}$ and $V_{TCREF}$ at block 160. At block 162, a value of $V_{CAL3(NEW)}$ is calculated according to Equation 6 and stored in memory. $V_{NIST}$ is again measured and its value is transmitted over loop 12 at block 164. This value should be approximately the same as $V_{NISTCAL}$. This completes calibration of voltage measurement, and probe 70 is connected to terminal block 14 for calibration of PRT sensor 34. At block 166, determination of $R_{PRTCAL(NEW)}$ is initiated and the value of $P_{NISTCAL}$ is obtained by microprocessor 22 at block 166 from calibrator 80 over loop 12. At block 168, microprocessor 22 measures $P_{PROBE}$ and $R_{PRT}$. At block 170, microprocessor 22 calculates $R_{PRTCAL(NEW)}$ using Equation 7, and this value is stored in memory 30. Block 172 shows the completion of the calibration procedure and control is returned to block 144.

Although the present invention has been described with reference to preferred embodiments, workers skilled in the art will recognize that changes may be made in form and detail without departing from the spirit and scope of the invention. For example, other types of references may be used and communication of the actual values of these references may be through any appropriate means. For example, although the calibration procedures described were explained with reference to two-wire transmitters, three- and four-wire transmitters can equally well make use of the inventions. For example, although four-wire resistance measurement has been described, the concepts set forth herein are applicable to two- or three-wire resistance measurement.

What is claimed is:

1. A calibrator for calibrating a temperature transmitter in a process control loop, comprising:

a NIST traceable reference;

a plurality of electrical connectors adapted for electrically connecting to a terminal block of the transmitter;

circuitry for coupling to the process control loop and transmitting values of the NIST traceable reference to the transmitter; and a switch connected for selectively coupling the NIST traceable reference to the plurality of electrical connectors.

2. The calibrator of claim 1 wherein the NIST traceable reference is a NIST traceable resistance.

3. The calibrator of claim 1 wherein the NIST traceable reference is a NIST traceable voltage.

4. The calibrator of claim 1 wherein the NIST traceable reference is a temperature probe.

5. The calibrator of claim 1 including a NIST traceable temperature probe adapter coupling to the terminal block and measuring a cold junction temperature.

6. A method of calibrating a temperature transmitter in a process control loop, comprising:

connecting an input of the transmitter to a NIST traceable reference;

transmitting the value of the NIST traceable reference to the transmitter;

comparing the communicated value of the NIST traceable reference with a measured value of the NIST traceable reference; and responsively calibrating the temperature transmitter based upon the comparison.

7. The method of claim 6 wherein the step of transmitting comprises transmitting information over the process control loop to the transmitter.

8. The method of claim 6 including transmitting the communicated value of the NIST traceable reference prior to calibrating and transmitting the measured value of the NIST traceable reference after calibration.

9. The method of claim 6 including:

measuring temperature of a terminal block of the transmitter;

communicating the measured temperature to the transmitter;

comparing communicated temperature with an internally measured terminal block temperature; and calibrating the transmitter based upon the comparison.

10. The method of claim 6 wherein the NIST traceable reference is a resistance.

11. The method of claim 6 wherein the NIST traceable reference is a voltage.

12. The method of claim 6 wherein the NIST traceable reference is a temperature probe.

* * * * *